United States Patent
Tagliasacchi et al.

(10) Patent No.: US 11,756,530 B2
(45) Date of Patent: Sep. 12, 2023

(54) SELF-SUPERVISED PITCH ESTIMATION

(71) Applicant: GOOGLE LLC, Mountain View, CA (US)

(72) Inventors: Marco Tagliasacchi, Lugano (CH); Mihajlo Velimirovic, Zurich (CH); Matthew Sharifi, Kilchberg (CH); Dominik Roblek, Meilen (CH); Christian Frank, Zurich (CH); Beat Gfeller, Duebendorf (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/640,579

(22) PCT Filed: Sep. 25, 2020

(86) PCT No.: PCT/US2020/052722
§ 371 (c)(1),
(2) Date: Mar. 4, 2022

(87) PCT Pub. No.: WO2021/076297
PCT Pub. Date: Apr. 22, 2021

(65) Prior Publication Data
US 2022/0343896 A1    Oct. 27, 2022

Related U.S. Application Data

(60) Provisional application No. 62/923,491, filed on Oct. 19, 2019.

(51) Int. Cl.
*G10L 15/06* (2013.01)
*G10L 21/013* (2013.01)
(Continued)

(52) U.S. Cl.
CPC .......... *G10L 15/063* (2013.01); *G10L 21/013* (2013.01); *G10L 25/30* (2013.01); *G10L 25/90* (2013.01)

(58) Field of Classification Search
CPC ....... G10L 25/90; G10L 25/30; G10L 21/003; G10L 21/013
See application file for complete search history.

(56) References Cited

U.S. PATENT DOCUMENTS 6,119,081 A * 9/2000 Cho .................. G10L 19/125
                                                704/207
6,456,965 B1 * 9/2002 Yeldener ............ G10L 25/90
                                                704/207

(Continued)

OTHER PUBLICATIONS

Camacho et al., "A sawtooth waveform inspired pitch estimator for speech and music," The Journal of the Acoustical Society of America, Oct. 2008, doi:10.1121/1.2951592.

(Continued)

*Primary Examiner* — Samuel G Neway
(74) *Attorney, Agent, or Firm* — McDonnell Boehnen Hulbert & Berghoff LLP

(57) ABSTRACT

Example embodiments relate to techniques for training artificial neural networks or oilier machine-learning encoders to accurately predict the pitch of input audio samples in a semitone or otherwise logarithmically-scaled pitch space. An example method may include generating, from a sample of audio data, two training samples by applying two different pitch shifts to the sample of audio training data. This can be done by converting the sample of audio data into the frequency domain and then shifting the transformed data. These known shifts are then compared to the predicted pitches generated by applying the two training samples to the encoder. The encoder is then updated based on the comparison, such that the relative pitch output by the encoder is improved with respect to accuracy. One or more audio samples, labeled with absolute pitch values, can then be used to calibrate the relative pitch values generated by the trained encoder.

20 Claims, 11 Drawing Sheets

(51) Int. Cl.
*G10L 25/30* (2013.01)
*G10L 25/90* (2013.01)

(56) References Cited

U.S. PATENT DOCUMENTS

| | | | | |
|---|---|---|---|---|
| 6,564,182 B1* | 5/2003 | Gao | ......................... | G10L 25/90 |
| | | | | 704/223 |
| 9,082,416 B2* | 7/2015 | Krishnan | ................. | G10L 25/90 |
| 2020/0273475 A1* | 8/2020 | Ravelli | .................... | G10L 25/90 |
| 2022/0343896 A1* | 10/2022 | Tagliasacchi | ........... | G10L 25/12 |

OTHER PUBLICATIONS

Christiansen et al., "UnsuperPoint: End-to-end Unsupervised Interest Point Detector and Descriptor," Technical Report, Jul. 10, 2019, arXiv:1907.04011.

Ziv et al., "Absolute and relative pitch: Global versus local processing of chords," Advances in Cognitive Psychology, 10(1):15-25, 2014, ISSN 1895-1171, doi: 10.2478/v10053-008-0152-7.

The International Search Report (ISR) with Written Opinion for PCT/US2020/052722 dated Dec. 8, 2020, pp. 1-11.

Gfeller, Beat et al. " SPICE: Self-Supervised Pitch Estimation" IEEE/ACM Transactions on Audio, Speech, and Language Processing (2020) vol. 28, pp. 1118-1128.

Kim, Jong Wook et al. "Crepe: A Convolutional Representation for Pitch Estimation", A 2018 IEEE International Conference on Acoustics, Speech and Signal Processing (ICASSP), (2018), pp. 161-165, XP033403896 [retrieved on Sep. 10, 2018].

Lloyd Watts "DeepPitch: Wide-Range Monophonic Pitch Estimation using Deep Convolutional Neural Networks" Jun. 14, 2018 (Jun. 14, 2018), XP055756717, retrieved from the Internet: URL:http://www.lloydwatts.com/images/2018-06-14 MonophonicPitchPaper.pdf [retrieved on Dec. 4, 2020].

\* cited by examiner

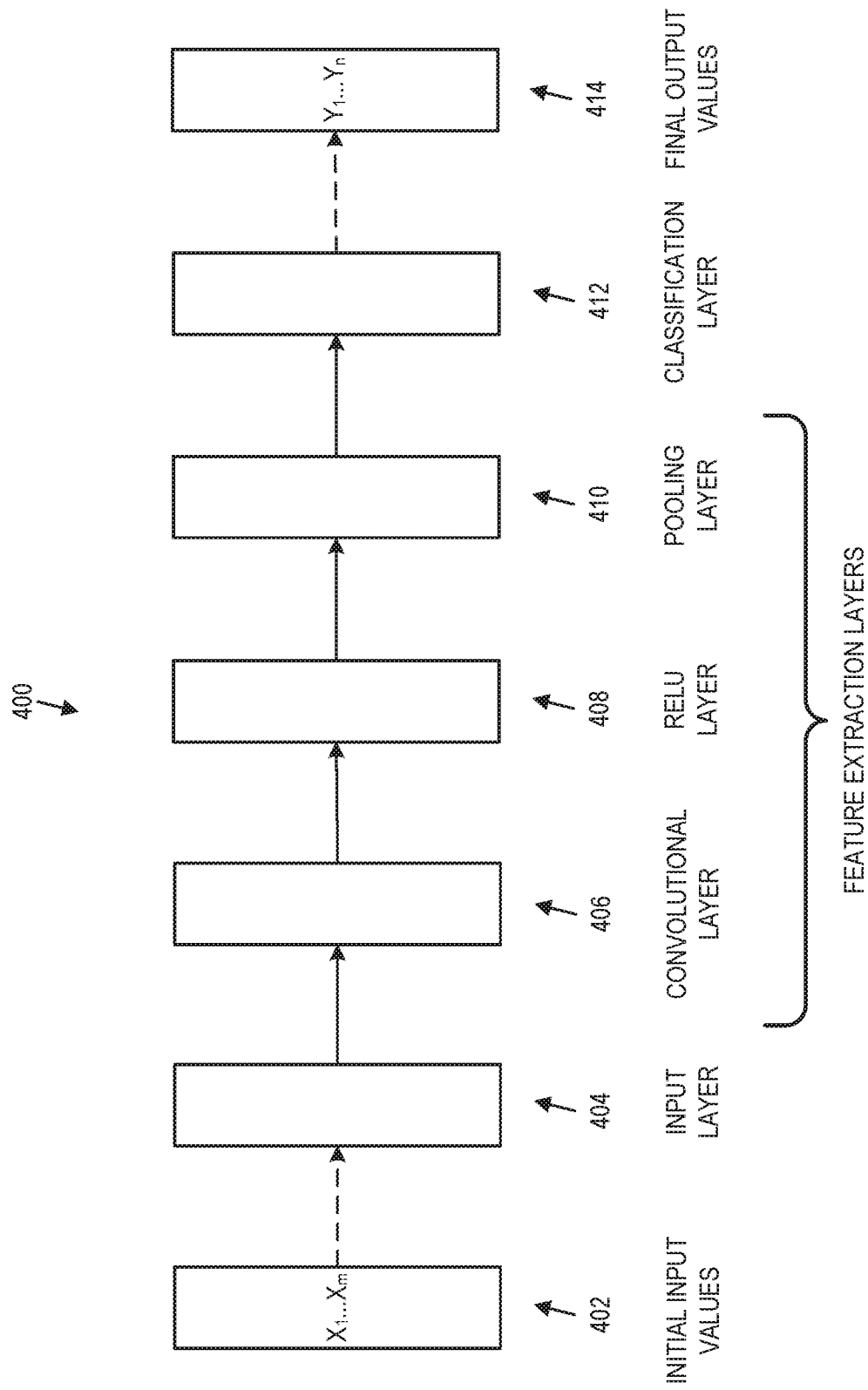

Figure 4B

SELF-SUPERVISED PITCH ESTIMATION

CROSS-REFERENCE TO RELATED APPLICATION

This application is a U.S. National Phase of International Application No. PCT/US2020/052722, filed Sep. 25, 2020, which claims priority to U.S. Provisional Application No. 62/923,491, filed Oct. 19, 2019, all of which are incorporated by reference herein in their entirety.

BACKGROUND

It is beneficial in a variety of applications to detect the pitch of sounds represented in an audio signal. For example, pitch detection can be used to facilitate automated and/or assisted translation of recorded music into sheet music. In another example, continuous detection of the pitch of an audio signal can be useful in training a person to sing, play an instrument, identify pitch, or to perform some other task.

A variety of methods exist for detecting pitch. Many of these methods include using heuristic algorithms to detect a fundamental frequency in the audio signal (e.g., by identifying a peak in a spectrum of the audio signal). However, such methods may perform poorly in the presence of noise, or in the presence of multiple sources of pitch in the audio signal.

SUMMARY

It is beneficial in a variety of applications to accurately predict, with high temporal and frequency resolution, the pitch of sound in an audio signal. The process of accurately determining pitch with high temporal and frequency resolution, however, is a difficult technical problem, especially when noise (e.g., other sounds representing other pitches) is present in the audio signal. A variety of supervised machine learning techniques could be applied to train an encoder to perform pitch prediction. However, it is difficult and/or expensive to generate a sufficient amount of training data that is annotated with 'correct' pitch values in order to perform such supervised techniques. This is especially true when high resolution in the temporal and frequency domains is desired.

In one aspect, the present application describes a method for training a pitch-predicting encoder. The method involves generating a first training sample based on an input audio sample. Generating the first training sample involves applying a first frequency shift to the input audio sample. The method also involves generating a second training sample based on the input audio sample. Generating the second training sample involves applying a second frequency shift to the input audio sample. Each of the first frequency shift and the second frequency shift is a positive amount, a negative amount, or a zero amount, such that at least one of the first training sample and the second training sample represents a frequency-shifted version of the input audio sample. The method further involves applying the first training sample and the second training sample to the encoder to generate a first predicted pitch value and a second predicted pitch value and determining an encoder cost function based on a pitch error term. The pitch error term depends on: (i) a first difference between the first predicted pitch value and the second predicted pitch value, and (ii) a second difference between the first frequency shift and the second frequency shift. The method also involves modifying the encoder based on the encoder cost function.

In another aspect, the present application describes a method for predicting a pitch for an audio sample. The method involves obtaining an audio sample, and applying the audio sample to an encoder to generate, for the audio sample, at least one of a predicted relative pitch value or a predicted absolute pitch value. The encoder has been trained according to the method for training a pitch-predicting encoder described above.

In yet another aspect, the present application describes system. The system includes a controller and a non-transitory computer-readable medium, having stored thereon program instructions that, upon execution by the controller, cause the controller to perform any of the methods described above.

In yet another aspect, the present application describes a non-transitory computer-readable medium having stored thereon program instructions that, upon execution by a computing device, cause the computing device to perform any method described above.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4A depicts a convolution neural network (CNN) architecture, according to one or more example embodiments.

FIG. 4B depicts a convolution, according to one or more example embodiments.

DETAILED DESCRIPTION

Figure 1:
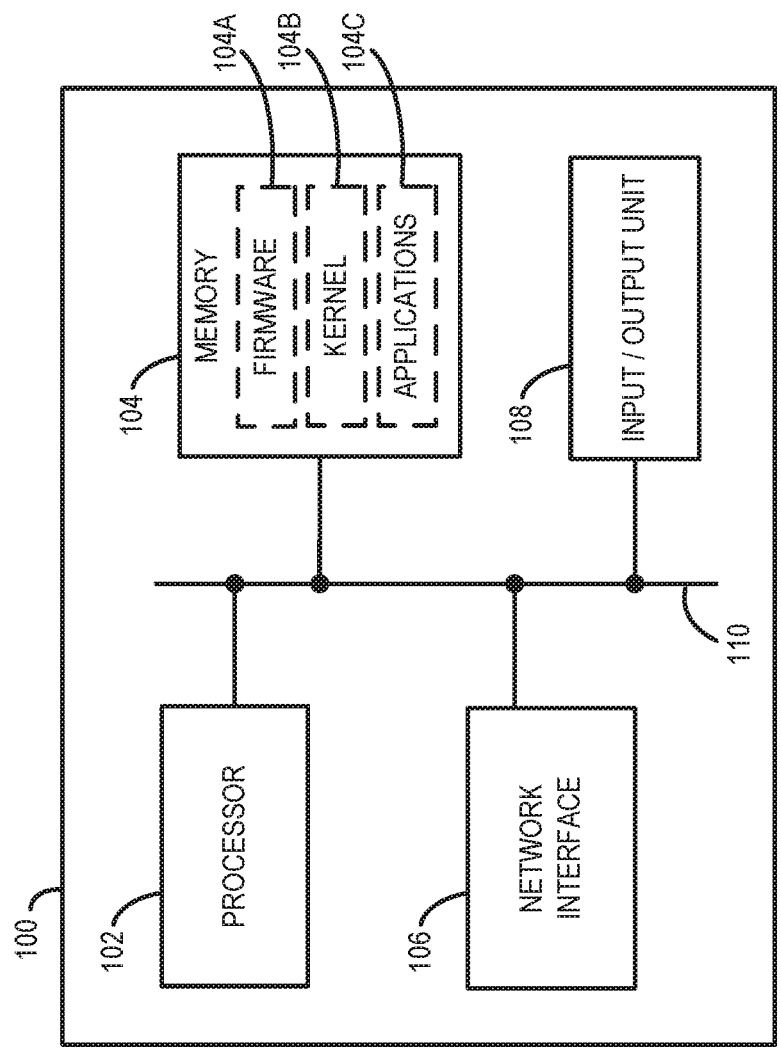
FIG. 1 illustrates a schematic drawing of a computing device, according to one or more example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Example embodiments are provided herein that include a self-supervised technique to train an encoder (or multiple encoders) to predict pitch values from audio samples. To generate training samples according to example techniques, a particular audio sample (e.g., a segment of audio from a set of audio training data) is used to generate two training samples, one or both of which have been pitch-shifted by a known amount (e.g., by an amount randomly selected from a uniform distribution). These two training samples are then applied to the encoder to generate respective pitch estimates. A difference between the difference in the predicted pitches and the known difference in the applied pitch shift(s) is used to update or otherwise train the encoder. Thus, after a number of such training updates, the encoder can accurately predict relative differences in pitch.

An encoder trained in this manner can be used to determine an absolute pitch for an audio sample by a calibration process that uses one or more audio samples having known pitch values. The encoder is used to predict respective pitch values for the audio samples, and the known pitch values are then used, in combination with the encoder-predicted pitch values, to generate offset, scale, and/or other bias values for the encoder. An absolute pitch value can then be determined for a novel audio sample by applying the bias value(s) to a pitch value generated by the encoder based on the novel audio sample.

The encoder could include an artificial neural network, a convolutional neural network, a recurrent neural network, a support vector machine, a n-nearest neighbors classifier, a decision tree, a regression tree, a collection of decision and/or regression trees (e.g., a regression forest), or some other algorithm or combination of algorithms. The encoder could receive a time-domain representation of the input audio sample (e.g., a segment of an audio signal that has been shifted to be zero-mean or otherwise pre-processed).

Additionally or alternatively, the encoder could receive a frequency-domain representation of the input audio sample. For example, the encoder could receive a version of the input audio sample that has been transformed using the constant-Q transform. The constant-Q transform can also provide benefits in that its outputs are already spaced on a logarithmic scale with respect to frequency, such that frequency-shifting a training sample that has been transformed according to the constant-Q transform can include index shifting, cropping, zero-padding, or other simple operations.

The encoder and/or encoder training technique could be expanded in a variety of ways. For example, the encoder could also output a confidence value that represents a degree of confidence or variability in the predicted pitch of an input sample. Such a confidence output could additionally be used to predict whether an audio sample represents voiced or unvoiced sound(s).

When training the encoder, a nonlinear function could be applied to a pitch difference error or other error terms. This could be done, e.g., to prevent unvoiced audio samples or other difficult-to-predict portions of the audio training data from having outsize effects on the weights of the trained encoder. Such a nonlinear function could change linearly for values with magnitudes above a threshold and nonlinearly for values with magnitudes beneath the threshold. For example, the nonlinear function could be a Huber loss function.

The encoder training process could be improved (e.g., with respect to a prediction accuracy of encoders trained via the process, with respect to a speed of convergence or other rate of training) by including error terms related to reconstruction of the training audio samples based on the predicted pitches. For example, each predicted pitch determined from a pair of training audio samples could be applied to a decoder to generate a respective reconstructed audio spectrum or signal. These reconstructed audio spectra could be compared (e.g., using a sum of squared errors, or some other loss function) and the decoder updated based on the comparison. The encoder could also be updated based on this comparison in combination with the comparison between the predicted pitch difference and the difference in the applied frequency shift(s).

Additionally or alternatively, the encoder training process could be improved by augmenting the training samples with noise. Such noise could include voiced pitch sounds. By augmenting the training samples in this way, the encoder could be trained to be more accurate when noise, including pitch-containing noise (e.g., noise from instruments in the background), is present in the input audio sample. In a particular example, pitch values could be predicted for (i) two frequency-shifted versions of an input audio sample, and (ii) versions of the two frequency-shifted versions of the input audio sample to which a noise signal (e.g., a background pitch-containing noise signal) has been added. The encoder could then be updated based on a cost function that includes an error term corresponding to each pairwise comparison between the training samples (e.g., a first term relating to the difference between the pitches predicted for the noise-free audio samples, a second term relating to the difference between the pitches predicted for the noise-free first audio sample and the noisy second audio sample, a third term relating to the difference between the pitches predicted for the noisy first audio sample and the noise-free second audio sample, and a fourth term relating to the difference between the pitches predicted for the noisy audio samples).

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

I. Example Computing Devices and Cloud-Based Computing Environments

The following embodiments describe architectural and operational aspects of example computing devices and systems that may employ machine learning and the disclosed ANN implementations, as well as the features and advantages thereof.

FIG. 1 is a simplified block diagram exemplifying computing system 100, illustrating some of the components that could be included in a computing device arranged to operate in accordance with the embodiments herein. Computing system 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing system 100 includes processor 102, memory 104, network interface 106, and an input/output unit 108, all of which may be coupled by a system bus 110 or a similar mechanism. In some embodiments, computing system 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing system 100 may include fixed memory as well as one or more removable memory units, the latter including but not limited to various types of secure digital (SD) cards. Thus, memory 104 represents both main memory units, as well as long-term storage. Other types of memory may include biological memory. Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing system 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing system 100. Applications 104C may be one or more user-space software programs, such as web browsers or email clients, as well as any software libraries used by these programs. In some examples, applications 104C may include one or more neural network applications and other deep learning-based applications. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing system 100 may include Ethernet, BLUETOOTH®, and Wifi interfaces.

Input/output unit 108 may facilitate user and peripheral device interaction with computing system 100 and/or other computing systems. Input/output unit 108 may include one or more types of input devices, such as a keyboard, a mouse, one or more touch screens, sensors, biometric sensors, and so on. Similarly, input/output unit 108 may include one or more types of output devices, such as a screen, monitor, printer, and/or one or more light emitting diodes (LEDs). Additionally or alternatively, computing system 100 may communicate with other devices using a universal serial bus (USB) or high-definition multimedia interface (HDMI) port interface, for example.

In some embodiments, one or more instances of computing system 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing system 100 may enable performance of embodiments described herein, including using neural networks or other techniques to train encoders to predict pitches from audio data.

Figure 2:
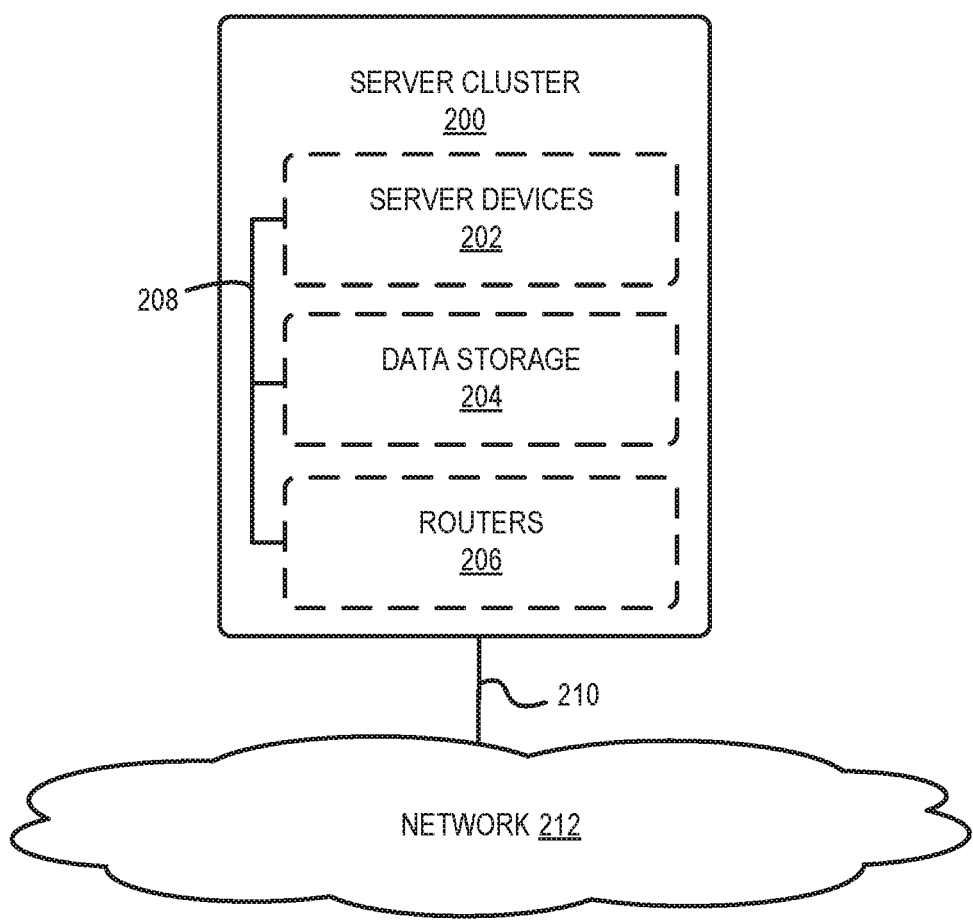
FIG. 2 illustrates a schematic drawing of a server device cluster, according to one or more example embodiments.

FIG. 2 depicts a cloud-based server cluster 200 in accordance with example embodiments. In FIG. 2, one or more operations of a computing device (e.g., computing system 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200. In some examples, server cluster 200 may perform one or more operations described herein, including the use of neural networks and/or other machine learning techniques to train models that can detect pitches (e.g., vocal pitches) within audio data.

Server devices 202 can be configured to perform various computing tasks of computing system 100. For example, one or more computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Artificial Neural Network

A. Example ANN

An artificial neural network (ANN) is a computational model in which a number of simple units, working individually in parallel and without central control, can combine to solve complex problems. An ANN is represented as a number of nodes that are arranged into a number of layers, with connections between the nodes of adjacent layers.

Figure 3A:
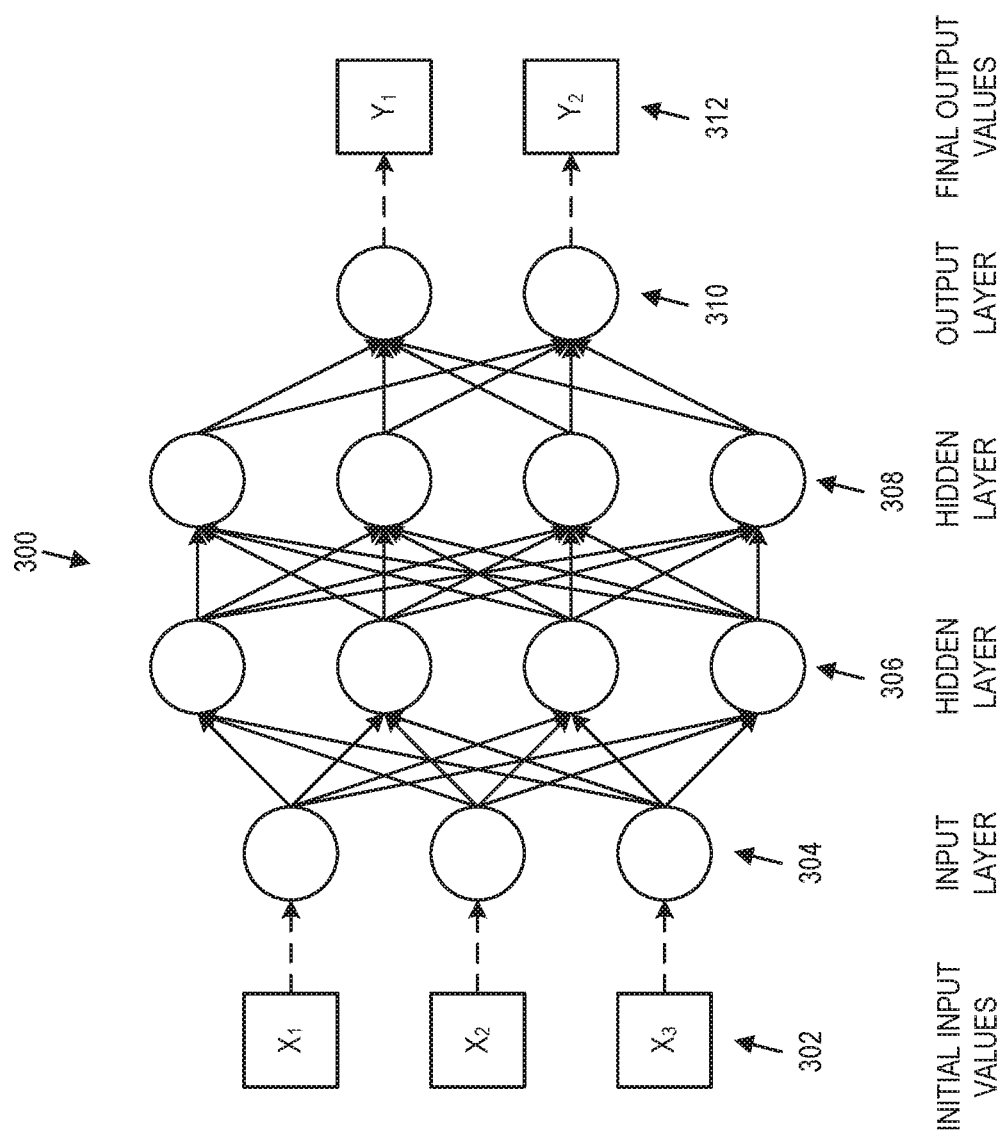
FIG. 3A depicts an artificial neural network (ANN) architecture, according to one or more example embodiments.

An example ANN 300 is shown in FIG. 3A. Particularly, ANN 300 represents a feed-forward multilayer neural network, but similar structures and principles are used in convolution neural networks (CNNs), recurrent neural networks, and recursive neural networks, for example. ANN 300 can represent an ANN trained to perform particular tasks, such as image processing techniques (e.g., segmentation, semantic segmentation, image enhancements) or learning pitch-training techniques described herein. In further examples, ANN 300 can learn to perform other tasks, such as computer vision, risk evaluation, etc.

As shown in FIG. 3A, ANN 300 consists of four layers: input layer 304, hidden layer 306, hidden layer 308, and output layer 310. The three nodes of input layer 304 respectively receive $X_1$, $X_2$, and $X_3$ as initial input values 302. The two nodes of output layer 310 respectively produce $Y_1$ and $Y_2$ as final output values 312. As such, ANN 300 is a fully-connected network, in that nodes of each layer aside from input layer 304 receive input from all nodes in the previous layer.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d=\Sigma_{i=1}^{n}x_iw_i+b \qquad (1)$$

where b is a node-specific or layer-specific bias.

Notably, the fully-connected nature of ANN 300 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1+e^{-d}} \qquad (2)$$

Functions other than the logistic function, such as the sigmoid or tanh functions, may be used instead.

Then, y may be used on each of the node's output connections, and will be modified by the respective weights thereof. Particularly, in ANN 300, input values and weights are applied to the nodes of each layer, from left to right until final output values 312 are produced. If ANN 300 has been fully trained, final output values 312 are a proposed solution to the problem that ANN 300 has been trained to solve. In order to obtain a meaningful, useful, and reasonably accurate solution, ANN 300 requires at least some extent of training.

B. Training

Training an ANN may involve providing the ANN with some form of supervisory training data, namely sets of input values and desired, or ground truth, output values. For example, supervisory training may enable an ANN to perform non-semantic tasks, which can involve providing training datasets to determine desired representations. For ANN 300, this training data may include m sets of input values paired with output values. More formally, the training data may be represented as:

$$\{X_{1,i}, X_{2,i}, X_{3,i}, \hat{Y}_{1,i}, \hat{Y}_{2,i}\} \qquad (3)$$

where i=1 . . . m, and $\hat{Y}_{1,i}$ and $\hat{Y}_{2,i}$ are the desired output values for the input values of $X_{1,i}$, $X_{2,i}$, and $X_{3,i}$.

The training process involves applying the input values from such a set to ANN 300 and producing associated output values. A loss function can be used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 300 in a fashion that results in a lower error for future iterations of the training data. For example, the update process can involve modifying at least one weight of ANN 300 such that subsequent applications of ANN 300 on training data generates new outputs that more closely match the ground truth masks that correspond to the training data.

The training process continues applying the training data to ANN 300 until the weights converge. Convergence occurs when the error is less than a threshold value or the change in the error is sufficiently small between consecutive iterations of training. At this point, ANN 300 is said to be "trained" and can be applied to new sets of input values in order to predict output values that are unknown. When trained to perform image processing techniques, ANN 300 may produce outputs of input images that closely resemble ground truths (i.e., desired results) created for the input images.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 300. Thus, the weights of the connections between hidden layer 308 and output layer 310 are updated first, the weights of the connections between hidden layer 306 and hidden layer 308 are updated second, and so on. This updating is based on the derivative of the activation function.

Figure 3B:
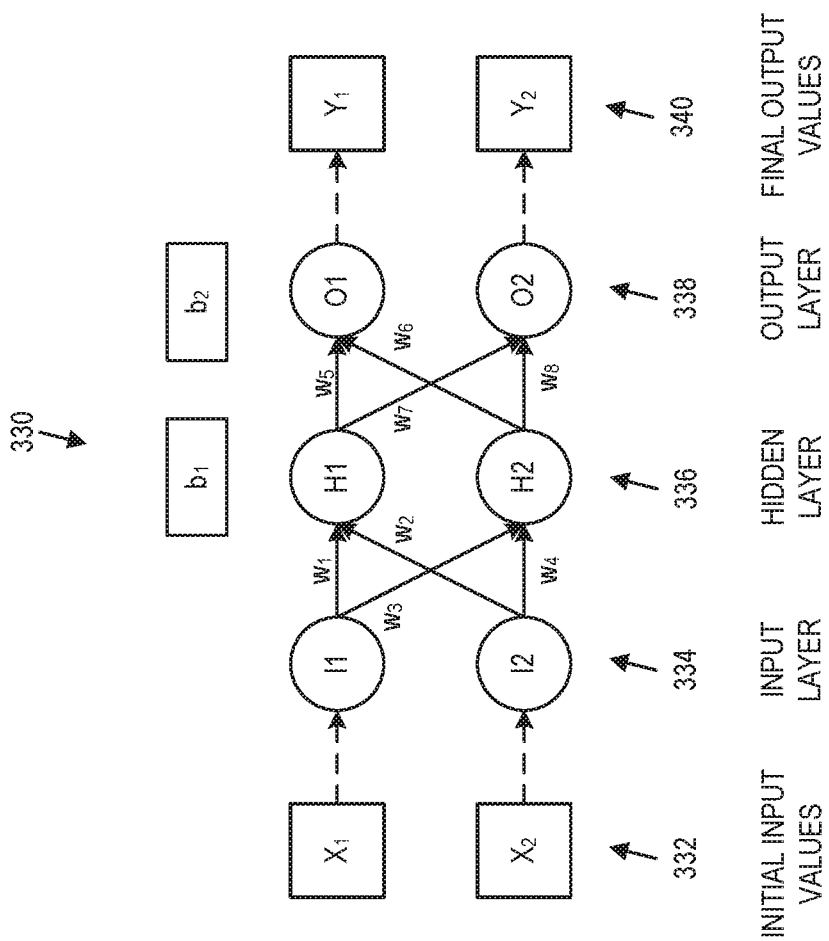
FIG. 3B depicts training the ANN, according to one or more example embodiments.

In order to further explain error determination and backpropagation, it is helpful to look at an example of the process in action. However, backpropagation can become quite complex to represent except on the simplest of ANNs. Therefore, FIG. 3B introduces a very simple ANN 330 in order to provide an illustrative example of backpropagation.

TABLE 1

| Weight | Nodes |
|--------|-------|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

ANN 330 consists of three layers, input layer 334, hidden layer 336, and output layer 338, each having two nodes. Initial input values 332 are provided to input layer 334, and output layer 338 produces final output values 340. Weights have been assigned to each of the connections and biases (e.g., $b_1$, $b_2$ shown in FIG. 3B) may also apply to the net input of each node in hidden layer 336 in some examples. For clarity, Table 1 maps weights to pair of nodes with connections to which these weights apply. As an example, $w_2$ is applied to the connection between nodes 12 and H1, $w_7$ is applied to the connection between nodes H1 and O2, and so on.

The goal of training ANN 330 is to update the weights over some number of feed forward and backpropagation iterations until the final output values 340 are sufficiently close to designated desired outputs. Note that use of a single set of training data effectively trains ANN 330 for just that set. If multiple sets of training data are used, ANN 330 will be trained in accordance with those sets as well.

1. Example Feed Forward Pass

To initiate the feed forward pass, net inputs to each of the nodes in hidden layer 336 are calculated. From the net inputs, the outputs of these nodes can be found by applying the activation function. For node H1, the net input $net_{H1}$ is:

$$net_{H1} = w_1 X_1 + w_2 X_2 + b_1 \quad (4)$$

Applying the activation function (here, the logistic function) to this input determines that the output of node H1, $out_{H1}$ is:

$$out_{H1} = \frac{1}{1 + e^{-net_{H1}}} \quad (5)$$

Following the same procedure for node H2, the output $out_{H2}$ can also be determined. The next step in the feed forward iteration is to perform the same calculations for the nodes of output layer 338. For example, net input to node O1, $net_{O1}$ is:

$$net_{O1} = w_5 out_{H1} + w_6 out_{H2} + b_2 \quad (6)$$

Thus, output for node O1, $out_{O1}$ is:

$$out_{O1} = \frac{1}{1 + e^{-net_{O1}}} \quad (7)$$

Following the same procedure for node O2, the output $out_{O2}$ can be determined. At this point, the total error, Δ, can be determined based on a loss function. For instance, the loss function can be the sum of the squared error for the nodes in output layer 508. In other words:

$$\Delta = \Delta_{O1} + \Delta_{O2} = \tfrac{1}{2}(out_{O1} - \hat{Y}_1)^2 + \tfrac{1}{2}(out_{O2} - \hat{Y}_2)^2 \quad (8)$$

The multiplicative constant ½ in each term is used to simplify differentiation during backpropagation. Since the overall result is scaled by a learning rate anyway, this constant does not negatively impact the training. Regardless, at this point, the feed forward iteration completes and backpropagation begins.

2. Backpropagation

As noted above, a goal of backpropagation is to use Δ (i.e., the total error determined based on a loss function) to update the weights so that they contribute less error in future feed forward iterations. As an example, consider the weight $w_5$. The goal involves determining how much the change in $w_5$ affects Δ. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \quad (9)$$

Thus, the effect on Δ of change to $w_5$ is equivalent to the product of (i) the effect on Δ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on Δ.

This process can be repeated for the other weights feeding into output layer 338. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 336. This process can be repeated for the other weights feeding into output layer 338. At this point, the backpropagation iteration is over, and all weights have been updated. ANN 330 may continue to be trained through subsequent feed forward and backpropagation iterations. In some instances, after over several feed forward and backpropagation iterations (e.g., thousands of iterations), the error can be reduced to produce results proximate the original desired results. At that point, the values of $Y_1$ and $Y_2$ will be close to the target values. As shown, by using a differentiable loss function, the total error of predictions output by ANN 330 compared to desired results can be determined and used to modify weights of ANN 330 accordingly.

In some cases, an equivalent amount of training can be accomplished with fewer iterations if the hyper parameters of the system (e.g., the biases $b_1$ and $b_2$ and the learning rate a) are adjusted. For instance, setting the learning rate closer to a particular value may result in the error rate being reduced more rapidly. Additionally, the biases can be updated as part of the learning process in a similar fashion to how the weights are updated.

Regardless. ANN 330 is just a simplified example. Arbitrarily complex ANNs can be developed with the number of nodes in each of the input and output layers tuned to address specific problems or goals. Further, more than one hidden layer can be used and any number of nodes can be in each hidden layer.

III. Convolutional Neural Networks

A convolutional neural network (CNN) is similar to an ANN, in that the CNN can consist of some number of layers of nodes, with weighted connections therebetween and possible per-layer biases. The weights and biases may be updated by way of feed forward and backpropagation procedures discussed above. A loss function may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

An example CNN 400 is shown in FIG. 4A. Initial input values 402, represented as pixels $X_1 \ldots X_m$, are provided to input layer 404. As discussed above, input layer 404 may have three dimensions based on the width, height, and number of color channels of pixels $X_1 \ldots X_m$. Input layer 404 provides values into one or more sets of feature extraction layers, each set containing an instance of convolutional layer 406, RELU layer 408, and pooling layer 410. The output of pooling layer 410 is provided to one or more classification layers 412. Final output values 414 may be arranged in a feature vector representing a concise characterization of initial input values 402.

Convolutional layer 406 may transform its input values by sliding one or more filters around the three-dimensional spatial arrangement of these input values. A filter is represented by biases applied to the nodes and the weights of the connections therebetween, and generally has a width and height less than that of the input values. The result for each filter may be a two-dimensional block of output values (referred to as a feature map) in which the width and height can have the same size as those of the input values, or one or more of these dimensions may have different size. The combination of each filter's output results in layers of feature maps in the depth dimension, in which each layer represents the output of one of the filters.

Figure 4B:
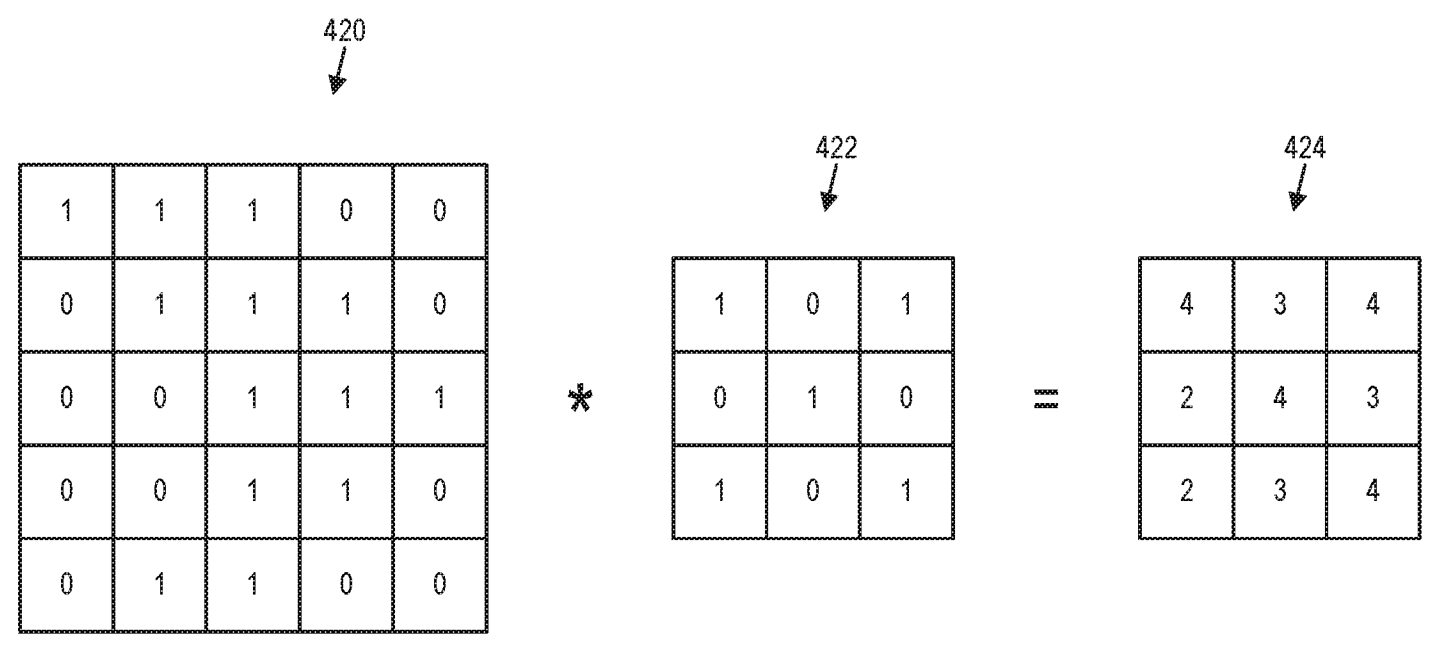

Applying the filter may involve calculating the dot-product sum between the entries in the filter and a two-dimensional depth slice of the input values. An example of this is shown in FIG. 4B. Matrix 420 represents input to a convolutional layer, and thus could be image data, for example. The convolution operation overlays filter 422 on matrix 420 to determine output 424. For instance, when filter 422 is positioned in the top left corner of matrix 420, and the dot-product sum for each entry is calculated, the result is 4. This is placed in the top left corner of output 424.

Turning back to FIG. 4A, a CNN learns filters during training such that these filters can eventually identify certain types of features at particular locations in the input values. As an example, convolutional layer 406 may include a filter that is eventually capable of detecting edges and/or colors in the image patch from which initial input values 402 were derived. A hyper-parameter called receptive field determines the number of connections between each node in convolutional layer 406 and input layer 404. This allows each node to focus on a subset of the input values.

RELU layer 408 applies an activation function to output provided by convolutional layer 406. In practice, it has been determined that the rectified linear unit (RELU) function, or a variation thereof, appears to provide strong results in CNNs. The RELU function is a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 410 reduces the spatial size of the data by down-sampling each two-dimensional depth slice of output from RELU layer 408. One possible approach is to apply a 2×2 filter with a stride of 2 to each 2×2 block of the depth slices. This will reduce the width and height of each depth slice by a factor of 2, thus reducing the overall size of the data by 75%.

Classification layer 412 computes final output values 414 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 410 may provide output to an instance of convolutional layer 406. Further, there may be multiple instances of convolutional layer 406 and RELU layer 408 for each instance of pooling layer 410.

CNN 400 represents a general structure that can be used in image processing. Convolutional layer 406 and classification layer 412 apply weights and biases similarly to layers in ANN 300, and these weights and biases may be updated during backpropagation so that CNN 400 can learn. On the other hand, RELU layer 408 and pooling layer 410 generally apply fixed operations and thus might not learn.

Not unlike an ANN, a CNN can include a different number of layers than is shown in the examples herein, and each of these layers may include a different number of nodes. Thus, CNN 400 is merely for illustrative purposes and should not be considered to limit the structure of a CNN.

IV. Self-Supervised Pitch Estimation

As a perceptual property of sound, pitch is both relative and intensive because pitch enables ordering to distinguish between high and low sounds and sources with different pitches can be mixed to produce a chord that differs from a single unified tone. Pitch is also be attributed to a sound independently of the pitch's source. For example, the note A4 is perceived as the same pitch whether the note A4 is played on a guitar or on a piano.

Pitch often corresponds to the fundamental frequency ($f_o$), which is the frequency of the lowest harmonic. However, the former is a perceptual property, while the latter is a physical property of the underlying audio signal. While there are a few notable exceptions (e.g., the Shepard tone, the tri-tone paradox, or some auditory illusions), the correspondence holds for the broad class of locally periodic signals, which represents a good abstraction for the audio signals further described herein.

Pitch estimation in monophonic audio can have importance in several domains, ranging from music information retrieval to speech analysis. Traditionally, simple signal processing pipelines were proposed, working either in the time domain, in the frequency domain, or both, often followed by post-processing algorithms to smooth the pitch trajectories. Until recently, machine learning techniques have not been able to outperform hand-crafted signal processing pipelines targeting pitch estimation. This was due to the lack of annotated data, which is particularly tedious and difficult to obtain at the temporal and frequency resolution required to train fully supervised models.

To overcome these limitations, synthetically generated datasets were proposed, obtained by re-synthesizing monophonic music tracks while setting the fundamental frequency to the target ground truth. Using this training data, some techniques were able to achieve state-of-the-art results when evaluated on the same dataset, outperforming signal processing baselines, especially under noisy conditions. These techniques, however, require a synthetically generated dataset to be able to generate models that can identify pitch.

Example embodiments address the problem of lack of annotated data from a different angle and do not rely upon a synthetically generated dataset. Specifically, example techniques presented herein may use self-supervision to define an auxiliary task (also known as a pretext task) that can be learned in a completely unsupervised way. To devise the pretext task, some techniques may involve initially observing that relative pitch related to the frequency interval between two notes can be estimated more easily by the human ear than estimating absolute pitch related to the actual fundamental frequency. Therefore, based on the above observation, some examples involve implementing a self-supervised pitch estimation (SPICE) that is designed to solve a similar pitch detection task as the human ear.

Some example systems may include network architecture configured with one or more convolutional encoders that can produce a single scalar embedding. Particularly, the system may enable development of a model that can linearly map the single scalar value to pitch when the pitch is expressed in a logarithmic scale (i.e., in units of semitones of an equally tempered chromatic scale). To develop the model, the system may initially feed two versions of the same signal (e.g., audio sample) to an encoder with one version being a pitch shifted version of the other version by a random but known amount of shift. As such, a loss function can be used that causes the difference between the scalar embeddings to be proportional to the known difference in pitch. Upon convergence, the model can be able to estimate relative pitch solely relying on self-supervision. In some embodiments, in order to translate relative pitch to absolute pitch, a calibration step may be performed using a small synthetically generated dataset, which can enable the model to produce absolutely pitch without having access to any manually labeled dataset.

Inputs (e.g., audio samples) received at a generated model can be a signal transformed in the domain defined by the constant-Q transform (CQT), which may be used for analyzing pitch. In particular, the CQT filter bank can be used to compute a wavelet transform with one or more wavelets that can be effectively used to represent the class of locally periodic signals. When the number of filters per octave (also known as quality factor) is large enough, wavelets may have a discernible pitch that is related to the logarithm of the scale variable. As a result, pitch shifting can be expressed as a simple translation along the log-spaced frequency axis induced by the CQT. This property can also hold for inharmonic or noisy audio signals for which the fundamental frequency cannot be defined. For example, stretching signals in time can produce a sensation of pitch shift, which may be observable in the CQT domain despite the absence of the fundamental frequency.

Another important aspect of pitch estimation involves determining whether the underlying signal is voiced or unvoiced. Instead of relying on handcrafted threshold mechanisms, example systems (e.g., models) may be augmented in such a way that enables learning the level of confidence of the pitch estimation. For example, a model may incorporate a simple fully connected layer that can receive the penultimate layer of the encoder as an input and subsequently produce a second scalar value that is trained to match the pitch estimation error.

In some embodiments, a system may implement a self-supervised pitch estimation model that can be trained without having access to any labeled dataset. Particularly, the system may use a self-supervised mechanism to estimate the confidence of the pitch estimation, which can be directly used for voice detection. For example, pitch estimation can be used to detect the voice of a user of a smartphone or another computing device using the model. As such, the generated model can be evaluated against publicly available monophonic datasets, which can show that the model may outperform handcrafted baselines despite not having access to ground truth labels. The model can also operate well in noisy conditions, such as when background music is present in addition to monophonic singing.

V. Example Systems

Figure 5:
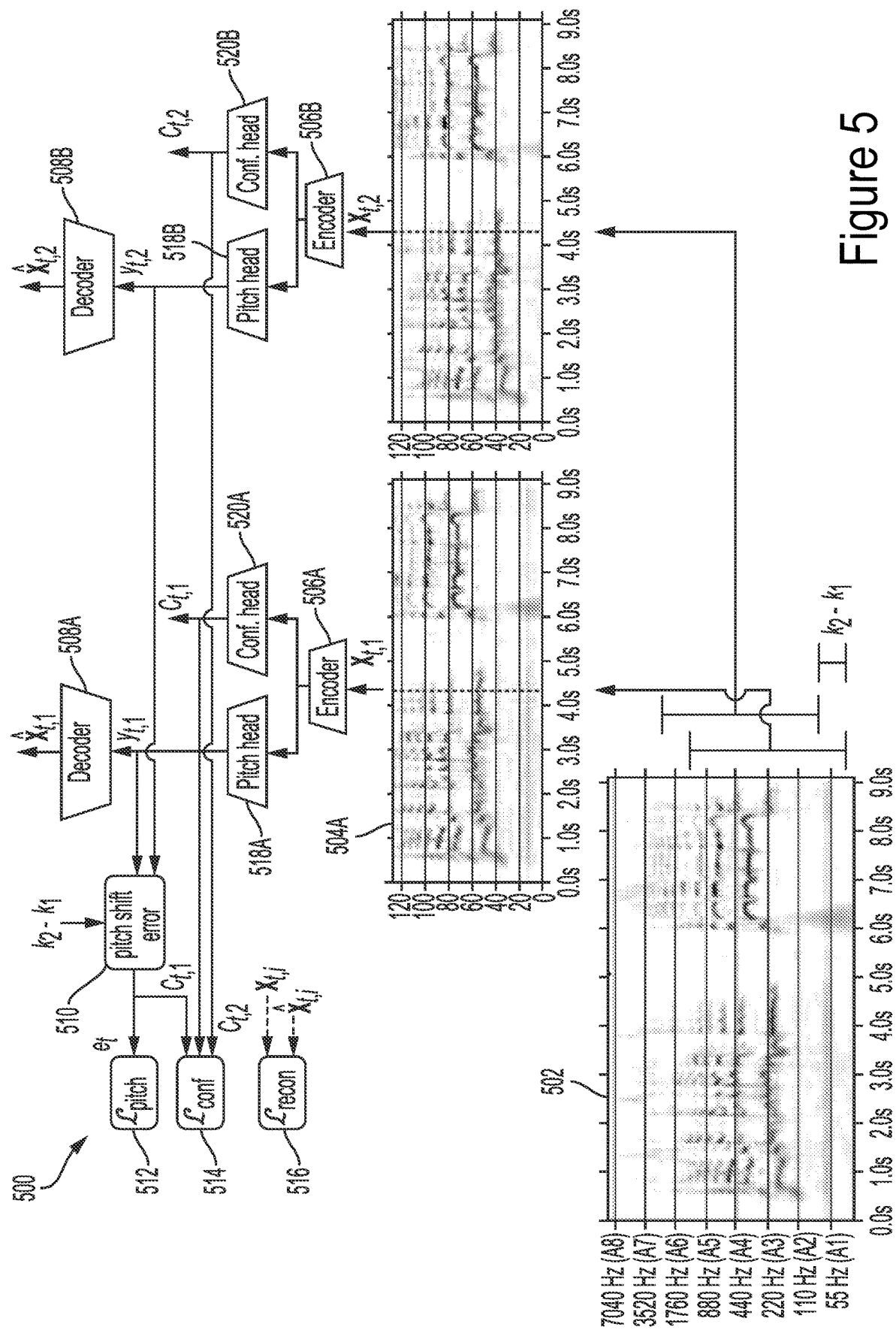
FIG. 5 depicts a system for training a pitch-predicting encoder, according to one or more example embodiments.

FIG. 5 depicts a system for training a pitch-predicting encoder, according to one or more example embodiments. In the example embodiment, system 500 includes audio sample 502, audio training samples 504A, 504B, encoders 506A, 506B, decoders 508A, 508B, pitch shift error 510, pitch loss 512, confidence loss 514, and reconstruction loss 516, pitch heads 518A, 518B, confidence heads 520A, 520B. In other embodiments, system 500 may include more or other components that can be used to train one or more pitch-predicting encoders.

System 500 may be implemented by one or more computing devices (e.g., computing system 100 shown in FIG. 1) configured to perform operations described herein. For example, a computing device may be used during the training process of encoders 506A, 506B. System 500 may be configured to develop a model or operate as a model configured to detect pitch within audio data. As such, system 500 may be used to represent one or more models described herein.

System 500 may receive an audio track of arbitrary length as an input (e.g., audio sample 502) and subsequently output a time series of estimated pitch frequencies, together with an indication of the confidence of the estimates. The confidence of the estimates can be used to discriminate between unvoiced frames, in which pitch is not well defined, and voiced frames (e.g., obtained from a user of a device). In some instances, system 500 may receive individual frames of the constant-Q transform (CQT) as input rather than consume audio data directly. Particularly, the CQT representation may approximately correspond to the output of a wavelet filter bank defined by the following family of wavelets:

$$\psi_{\lambda_k}(t) = \lambda_k \psi(\lambda_k t) \quad (10)$$

where Q denotes the number of filters per octave and $$\lambda_k = f_{base} 2^{\frac{k}{Q}}, \quad (11)$$
$$k \in 0, \ldots, F_{max} - 1$$

where $f_{base}$ is the frequency of the lowest frequency bin and $F_{max}$ is the number of CQT bins. The Fourier transform of the wavelet filters can then be expressed as follows:

$$\Psi_{\lambda_k} = \Psi\left(\frac{f}{\lambda_k}\right) \quad (12)$$

In some embodiments, when the center frequency of $\Psi(f)$ is normalized to 1, each filter is centered at frequency $\lambda_k$ and has a bandwidth equal to $\lambda_k/Q$. As a result, if two filters with indices $(k_1)$ and $(k_2)$ are considered, one of the corresponding wavelets would be the pitch-shifted version of the other as represented by audio training samples 504A, 504B. That is, $$\Delta k = k_2 - k_1 = Q \cdot \log_2 \alpha \quad (13)$$

where $\alpha = \lambda_{k2}/\lambda_{k1}$.

Particularly, each audio training sample 504A, 504B may represent a frequency shift of audio sample 502. The shift for each training sample 504A, 504B relative to audio sample 502 may be a known zero, positive, or negative amount. Therefore, for the class of locally periodic signals that can be represented as a wavelet expansion, a translation of ($\Delta k$) bins in the CQT domain can be related to a pitch-shift by a factor ($\alpha$). Because this key property of mapping pitch-shift to a simple translation may not hold for some other audio frontends (e.g., the mel spectrogram), the relationship between frequency (in Hz) and mel units may be given as follows:

$$m = c \cdot \log\left(1 + \frac{f}{f_{break}}\right) \quad (14)$$

for some constants c and break frequency ($f_{break}$). As a result, the relationship may be approximately linear at low frequencies ($f \ll f_{break}$) and logarithmic at high frequencies ($f \gg f_{break}$), with a smooth transition between these two regimes. Thus, system 500 may be able to show that a multiplicative scaling of frequencies may not correspond to an additive scaling in the mel domain.

Given an input track (e.g., audio sample 502), system 500 may initially compute the absolute value of the CQT transform, which can be represented as a real-valued matrix X of size $T \times F_{max}$, where T depends on the selected hop length. From each temporal frame $t=1, \ldots, T$ (where T is equal to the batch size during training), system 500 may randomly sample two integer offsets (i.e., $k_{t,1}$ and $k_{t,2}$) from a uniform distribution (i.e., $k_{t,i} \sim U(k_{min}, k_{max})$) and further extract two corresponding slices $x_{t,1}, x_{t,2} \in \mathbb{R}^F$, spanning the range of CQT bins $[k_{t,i}, k_{t,i}+F]$, $i=1, 2$, where F is the number of CQT bins in the slice. Then, system 500 may cause each vector to be fed to the same encoder to produce a single scalar $y_{t,i} = Enc(x_{t,i}) \in \mathbb{R}$.

In some examples, one or both encoders 506A, 506B within system 500 may be a neural network with an amount (L) of convolutional layers followed by one or more fully-connected layers (e.g., two fully-connected layers). As such, encoders 506A, 506B may be trained to detect pitches within audio sample 502 and other audio data. Particularly, the main loss utilized by system 500 may be designed in such a way that $y_{t,i}$ is encouraged to encode pitch. Relative pitch error ($e_t$) 510 may be designed as follows:

$$e_t = |(y_{t,1} - y_{t,2}) - \sigma(k_{t,1} - k_{t,2})| \quad (15)$$

Then, pitch loss ($\mathcal{L}_{pitch}$) 512 can be defined as the Huber norm of the pitch error ($e_t$) as shown:

$$\mathcal{L}_{pitch} = \frac{1}{T} \sum_t h(e_t) \quad (16)$$

where:

$$h(x) = \begin{cases} \frac{x^2}{2}, & |x| \leq \tau \\ \frac{\tau^2}{2} + \tau(|x| - \tau), & \text{otherwise} \end{cases} \quad (17)$$

The pitch difference scaling factor ($\sigma$) may be adjusted in such a way that $y_t \in [0,1]$ when pitch is in the frequency range $[f_{min}, f_{max}]$ as follows:

$$\sigma = \frac{1}{Q \cdot \log_2\left(\frac{f_{max}}{f_{min}}\right)} \quad (18)$$

The values of $f_{max}$ and $f_{min}$ can be determined based on the range of pitch frequencies spanned by the training set. In some instances, system 500 may operate as a model (or generate a model) that is less sensitive to the presence of unvoiced frames in the training dataset due to the Huber norm. As a result, relative pitch shift error ($e_t$) 510 can be large since pitch may not be well defined in this case. In addition to pitch loss ($\mathcal{L}_{pitch}$) 512, the following reconstruction loss ($\mathcal{L}_{recon}$) 614 may be used:

$$\mathcal{L}_{recon} = \frac{1}{T}\sum_t \|x_{t,1} - \hat{x}_{t,1}\|_2^2 + \|x_{t,2} - \hat{x}_{t,2}\|_2^2 \quad (19)$$

where $\hat{x}_{t,i}$, i=1, 2, is a reconstruction of the input frame obtained by feeding $y_{i,t}$ into a decoder $\hat{x}_{t,i}=\text{Dec}(y_{i,t})$ (e.g., decoder 508A, 508B). Reconstruction loss ($\mathcal{L}_{recon}$) 516 may cause the reconstructed frame ($\hat{x}_{t,i}$) to be as close as possible to the original frame ($x_{t,i}$).

One or both decoders 508A, 508B may be a neural network with a number L convolutional layers with architecture that is the mirrored version of the encoder, with convolutions replaced by transposed convolutions, which maps the scalar value ($y_{i,t}$) back to a vector with the same shape as the input frame. As a result, the overall loss $\mathcal{L}$ can be defined as:

$$\mathcal{L} = \omega_{pitch}\mathcal{L}_{pitch} + \omega_{recon}\mathcal{L}_{recon} \quad (20)$$

where $\omega_{pitch}$ and $\omega_{recon}$ represent scalar weights that can be used to determine the relative importance assigned to the two loss components. In some configurations, system 500 may be used to only estimate relative pitch differences. Particularly, the absolute pitch ($\hat{p}_{0,t}$) of an input frame can be obtained by applying an affine mapping:

$$\hat{p}_{0,t}=b+s\cdot y_t=b+s\cdot\text{Enc}(x_t) \text{ [semitones]} \quad (21)$$

which depends on two parameters. Equation 21 can be used to map the output of the encoder ($y_t$) (e.g., encoders 506A, 506B) from the [0, 1] range to the absolute pitch range (expressed in semitones).

In some examples, a small amount of synthetically generated data (locally periodic signals with a known frequency) may be used to estimate both the intercept ($\hat{b}$) and the slope ($\hat{s}$). More specifically, a waveform that is piecewise harmonic and consists of M pieces may be generated. Each piece of the waveform may be purely harmonic signal with fundamental frequency ($f_0$) corresponding to a semitone sampled uniformly at random in the range A2 (110 Hz) and A4 (440 Hz). The amplitude of the first harmonic in $a_0 \sim N(0, 1)$ and that of higher order harmonics in $a_k \sim a_0 \cdot U(0, 1)$, k=1, ..., K may be sampled and a random phase can be applied to each harmonic.

In some embodiments, each piece of the waveform may be configured as N·H samples long, where H denotes the CQT hop-length used by system 500 and N represents the number of frames. The waveform can be fed to system 500 to produce one or more estimates for the central frame in each piece (to mitigate errors due to boundary effects), which may lead to M synthetically generated samples that can be used by system 500. Thus, pitch can be expressed in semitones and it can be converted to frequency (in Hz) as follows:

$$\hat{f}_{0,t} = f_{base}2^{\frac{\hat{p}_{0,t}}{12}} \text{ [Hz]} \quad (22)$$

In addition to the estimated pitch ($\hat{p}_{0,t}$), system 500 can also produce a confidence level ($c_t$) ranging from zero to one (i.e., $c_t \in [0, 1]$). When audio sample 502 is voiced, system 500 may be able to produce high confidence estimates. Conversely, when audio sample 502 is unvoiced, the pitch may not be well defined, which may result in system 500 producing a low confidence.

One or both encoders 506A, 506B may be designed to have two heads (e.g., pitch head 518A and confidence head 520A) on top of the convolutional layers as illustrated in FIG. 5. In the embodiment shown, the first head (e.g., pitch heads 518A, 518B) consists of two fully-connected layers and produces the pitch estimate ($y_t$) and the second head (e.g., confidence heads 520A, 520B) consists of a single fully-connected layer and produces the confidence level ($c_t$). To train the second head, the following confidence loss ($\mathcal{L}_{conf}$) 514 may be used:

$$\mathcal{L}_{conf} = \frac{1}{T}\sum_t |(1-c_{t,1}) - e_t/\sigma|^2 + |(1-c_{t,2}) - e_t/\sigma|^2 \quad (23)$$

By including the confidence loss ($\mathcal{L}_{conf}$) 514 during training, system 500 may be able to operate at high confidence levels ($c_t \sim 1$) and correctly estimate the pitch difference between the two input slices in some instances. In some embodiments, to increase the ability to accurately estimate pitch, system 500 may be configured to stop the gradients during the backpropagation training step to cause loss confidence ($\mathcal{L}_{conf}$) 514 to only influence the training of the confidence head (e.g., confidence heads 520A, 520B) without affecting the other layers of the encoder architecture.

System 500 may also be configured to detect pitch within audio samples (e.g., audio sample 502) that include background music or other noises. In some instances, pitch estimation accuracy can be affected by noisy conditions, such as when an audio sample includes a singing voice superimposed over background music. When audio sample 502 includes noisy conditions (i.e., polyphonic audio data), system 500 can be configured to focus only on the singing voice source and differentiate from the background noise.

In some examples, system 500 may incorporate a data augmentation during training. For example, the clean singing voice signal can be mixed with the corresponding instrumental backing track at different levels of signal-to-noise (SNR) ratios. In other examples, system 500 may utilize one or more modified loss functions. For example, using $x_{t,i}^c$ to denote the CQT of the clean input audio sample, $x_{t,i}^n$ to denote the CQT of the noisy input audio sample, and $y_{t,i}^c$ and $y_{t,i}^n$ denote the corresponding outputs of the encoder, pitch error loss ($\mathcal{L}_{pitch}$) 512 can be modified by averaging four different variants of the error as follows:

$$e_t^{pq}=|(y_{t,1}^p-y_{t,2}^q)-\sigma(k_{t,1}-k_{t,2})|, p,q \in \{c,n\} \quad (24)$$

$$\mathcal{L}_{pitch}=\frac{1}{4}\Sigma_t\Sigma_{p,q\in\{c,n\}}h(e_t^{pq}) \quad (25)$$

As shown in equation 26, the reconstruction loss ($\mathcal{L}_{recon}$) 516 can also be modified to cause the decoder to reconstruct clean samples only.

$$\mathcal{L}_{recon} = \frac{1}{T}\sum_t \|x_{t,1}^c - \hat{x}_{t,1}\|_2^2 + \|x_{t,2}^c - \hat{x}_{t,2}\|_2^2 \quad (26)$$

By modifying the loss functions, encoders 506A, 506B can be induced to represent outputs that include information relative to the clean input audio samples, thus learning to de-noise the input by separating the singing voice from noise (e.g., background music).

Figure 6:
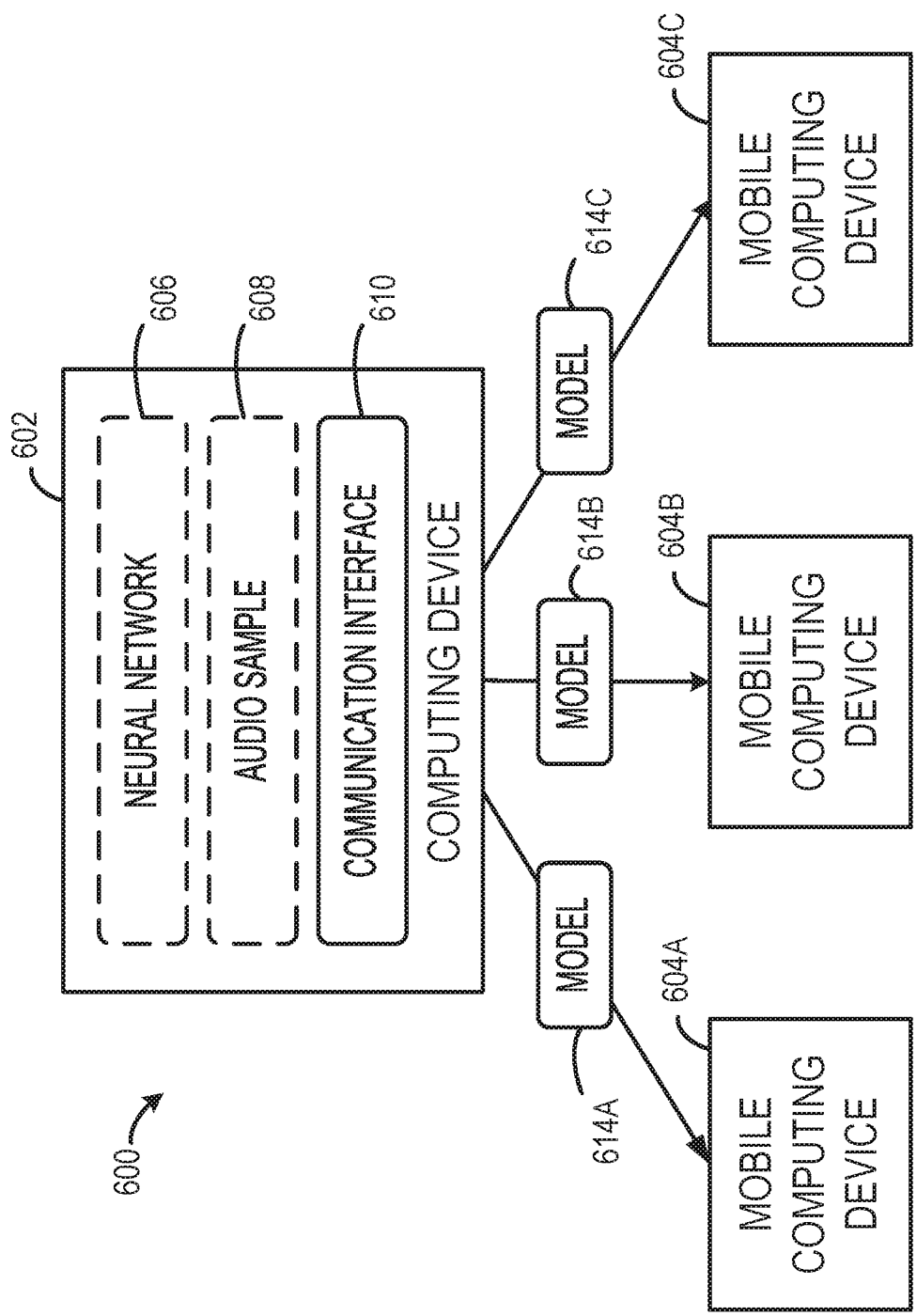
FIG. 6 illustrates a system for distributing pitch-predicting encoder models, according to one or more example embodiments.

FIG. 6 illustrates a system involving a computing device distributing models to mobile computing devices, according to one or more example embodiments. System 600 includes computing device 602 shown providing models 614A, 614B, 614C to mobile computing devices 604A, 604B, and 604C, respectively. In the embodiment shown in FIG. 6, computing device 602 includes neural network 606, audio sample 608, and communication interface 610. Computing device 602 may include other elements or components in other examples.

Computing device 602 may represent one or more computing devices configured to perform operations described herein. For example, computing device 602 may be implemented as computing device 100 shown in FIG. 1. As such, computing device 602 may develop and provide models 614A0-614C to mobile computing devices 604A-604C.

In the embodiment shown in FIG. 6, computing device 602 may generate the models 614A-614C based on audio sample 608. Models 614A-614C may correspond to system 500 or a model implemented by system 500 shown in FIG. 5. For example, computing device 602 may obtain audio sample 608 from another device or a different source. Computing device 602 may train neural network 606 to train one or more pitch-estimating encoders based on audio sample 608. As such, computing device 602 may generate models 614A-614C based on audio sample 608 and subsequently provide (e.g., wirelessly transmit) models 614A-614C to mobile computing devices 604A-604C using communication interface 610. For example, each mobile computing device may receive a model transmitted as a software update. Mobile computing devices 604A-604C may use models 614A-614C to perform operations based on a user's vocal inputs.

VI. Example Methods

Figure 7:
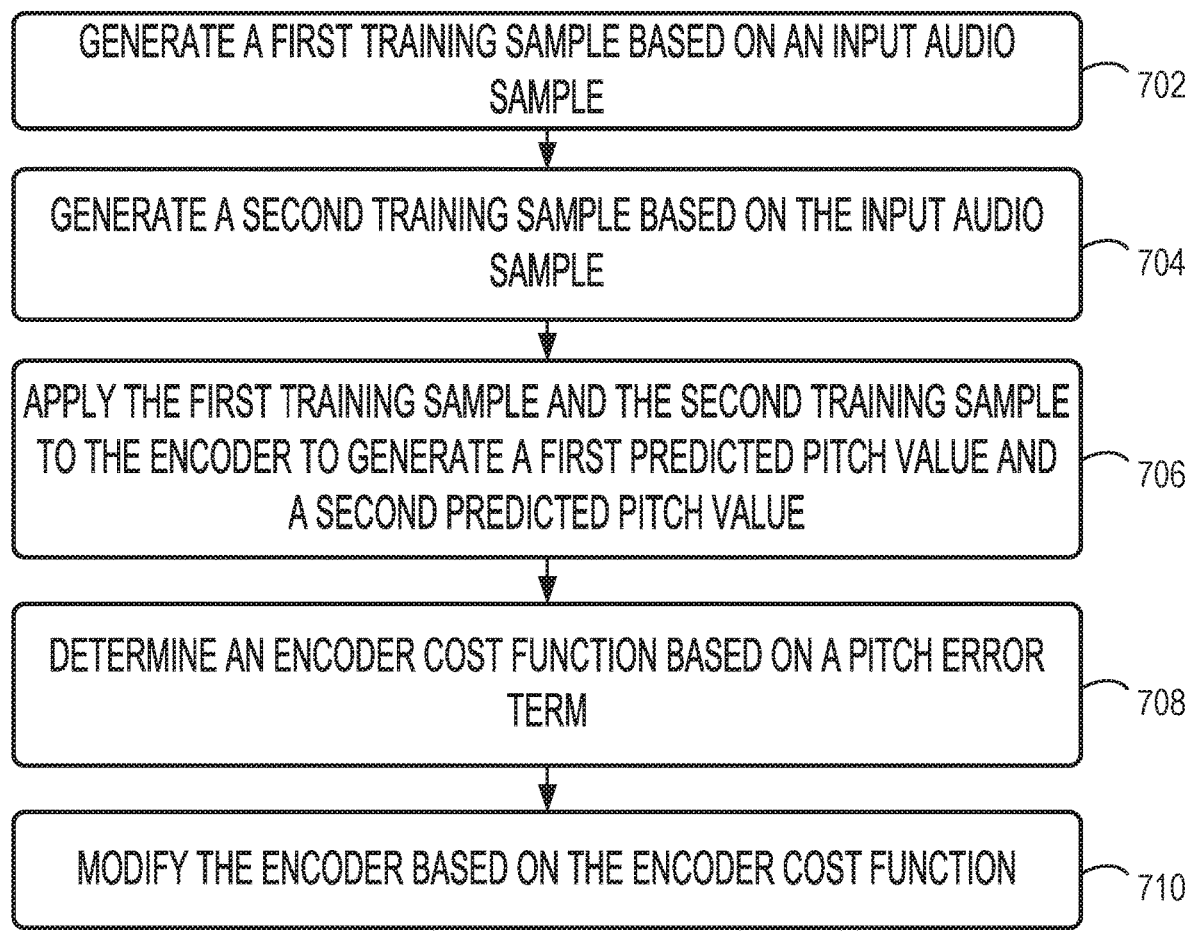
FIG. 7 is a flow chart of a method for training a pitch-predicting encoder, according to one or more example embodiments.

FIG. 7 is a flow chart of a method 700, according to one or more example embodiments. Method 700 may include one or more operations, functions, or actions as illustrated by one or more of blocks 702, 704, 706, 708, and 710. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, a tangible storage device, or other article of manufacture, for example. Furthermore, for method 700 and other processes and methods disclosed herein, each block in FIG. 7 may represent circuitry that is wired to perform the specific logical functions in the process.

At block 702, method 700 involves generating a first training sample based on an input audio sample. Generating the first training sample involves applying a first amount of frequency shifting to the input audio sample.

At block 704, method 700 involves generating a second training sample based on the input audio sample. Generating the second training sample involves applying a second amount of frequency shifting to the input audio sample.

Each of the first amount and second amount of frequency shifting is a positive amount, a negative amount, or a zero amount, such that at least one of the first or second training samples represents a frequency-shifted version of the input audio sample. For example, the first frequency shift may be a first non-zero amount and the second frequency shift may be a second non-zero amount with the first non-zero amount being different than the second non-zero amount.

In some examples, generating each training sample may involve applying a frequency transformation to the input audio sample to generate a transformed version of the input audio sample and also frequency-shifting the transformed version of the input audio sample. Applying the frequency transformation to the input audio sample may involve applying a constant-Q transform to the input audio sample.

At block 706, method 700 involves applying the first training sample and the second training sample to the encoder to generate a first predicted pitch value and a second predicted pitch value. The encoder may include a neural network having at least one convolutional layer.

In some examples, applying the first training sample and the second training sample to the encoder to generate the first predicted pitch value and the second predicted pitch value further involves generating a first pitch confidence value and a second pitch confidence value.

In some examples, the encoder may involve at least one convolutional layer, a pitch head that receives inputs from the at least one convolutional layer and that outputs a predicted pitch value. Particularly, the pitch head may include two fully-connected layers. The encoder may also include a confidence head that receives inputs from the at least one convolutional layer and that outputs a pitch confidence value, wherein the pitch head comprises one fully-connected layer.

At block 708, method 700 involves determining an encoder cost function based on a pitch error term. The pitch error term is based on a first difference between the first predicted pitch value and the second predicted pitch values, and a second difference between the first amount of frequency shifting and the second amount of frequency shifting.

In some examples, determining the encoder cost function involves applying a nonlinear function to the pitch error term. The nonlinear function may be linear for values of the pitch error term that are greater in magnitude than a threshold value and nonlinear for values of the pitch error term that are lesser in magnitude than the threshold value. In some examples, the nonlinear function is a Huber loss function.

At block 710, method 700 involves modifying the encoder based on the encoder cost function. Modifying the encoder may involve adjusting one or more parameters of the encoder. Some examples may involve obtaining a further audio sample and applying the further audio sample to the updated encoder to generate a predicted relative pitch value for the further audio sample.

Method 700 may also involve obtaining a calibration audio sample and obtaining a ground truth pitch value for the calibration audio sample. The computing device may apply the calibration audio sample to the updated encoder to generate a calibration pitch value. Based on the ground truth pitch value and the calibration pitch value, method 700 may also involve determining a bias pitch value for the updated encoder.

In addition, method 700 may also involve obtaining a further audio sample, applying the further audio sample to the updated encoder to generate a predicted relative pitch value for the further audio sample, and determining, based on the further predicted pitch value and the bias pitch value, a predicted absolute pitch value for the further audio sample.

In some examples, the encoder may include at least one convolutional layer, a pitch head that receives inputs from the at least one convolutional layer and that outputs a predicted pitch value, and a confidence head that receives inputs from the at least one convolutional layer and that outputs a pitch confidence value. As such, modifying the encoder based on the encoder cost function may involve updating, based on the encoder cost function, at least one parameter of the at least one convolutional layer and at least one parameter of the pitch head. Method 700 may also further involve determining a confidence cost function based on: (i) the first and second pitch confidence values, (ii) the first difference between the first predicted pitch value and the second predicted pitch value, and (iii) the second difference between the first frequency shift and the second frequency shift, and updating at least one parameter of the pitch head based on the confidence cost function.

In some examples, method 700 may further involve applying the first predicted pitch value and the second predicted pitch value to a decoder to generate a first reconstructed audio sample and a second reconstructed audio sample and determining a reconstruction error term based on a third difference between the first reconstructed audio sample and the second reconstructed audio sample. In some instances, the decoder may have a structure that is an inverted version of a structure of the encoder. As such, determining the encoder cost function may involve determining the encoder cost function based on the reconstruction error term. Method 700 may then also involve updating at least one parameter of the decoder based on the reconstruction error term.

Some examples may further involve generating a third training sample by adding background noise to the first training sample and applying the third training sample to the encoder to generate a third predicted pitch value. The computing device may generate a second pitch error term based on a difference between the second predicted pitch value and the third predicted pitch value and the first difference between the first frequency shift and the second frequency shift. As such, determining the encoder cost function may also be based on the second pitch error term.

Further examples may involve generating a fourth training sample by adding background noise to the second training sample and applying the fourth training sample to the encoder to generate a fourth predicted pitch value. The computing device may generate a third pitch error term based on a difference between the first and fourth predicted pitch values and the difference between the first frequency shift and the second frequency shift. The computing device may also generate a fourth pitch error term based on a difference between the second and fourth predicted pitch values and the second difference between the first frequency shift and the second frequency shift. As such, the encoder cost function may be determined based on the third and fourth pitch error term.

Figure 8:
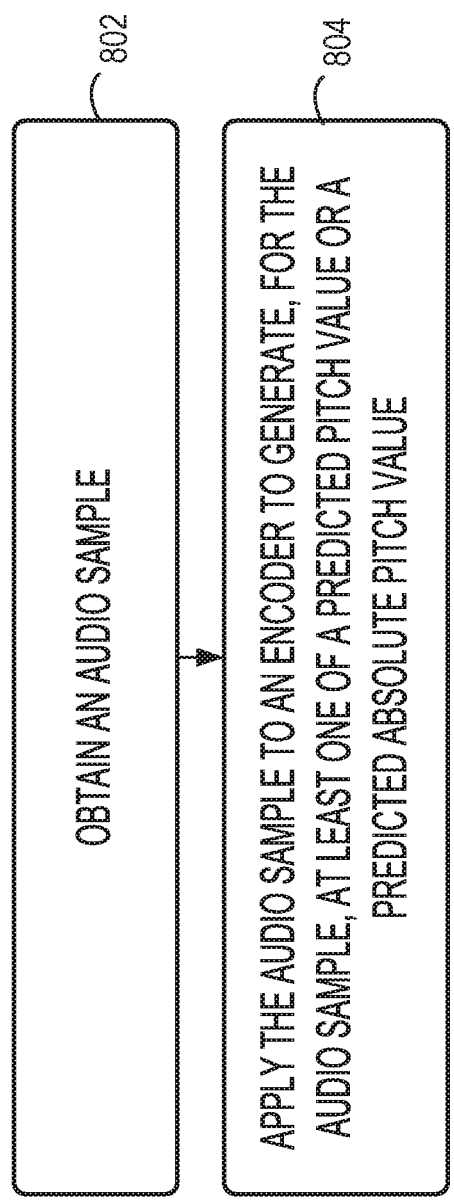
FIG. 8 is another flow chart of a method for predicting a pitch using a trained encoder, according to one or more example embodiments.

FIG. 8 is a flow chart of a method 800, according to one or more example embodiments. Method 800 may include one or more operations, functions, or actions as illustrated by one or more of blocks 802 and 804. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, method 800 involves obtaining an audio sample. The audio sample may have different features within examples.

At block 804, method 800 involves applying the audio sample to an encoder to generate, for the audio sample, at least one of a predicted relative pitch value or a predicted absolute pitch value. The encoder may have been trained using method 700 or any other techniques described herein.

Figure 9:
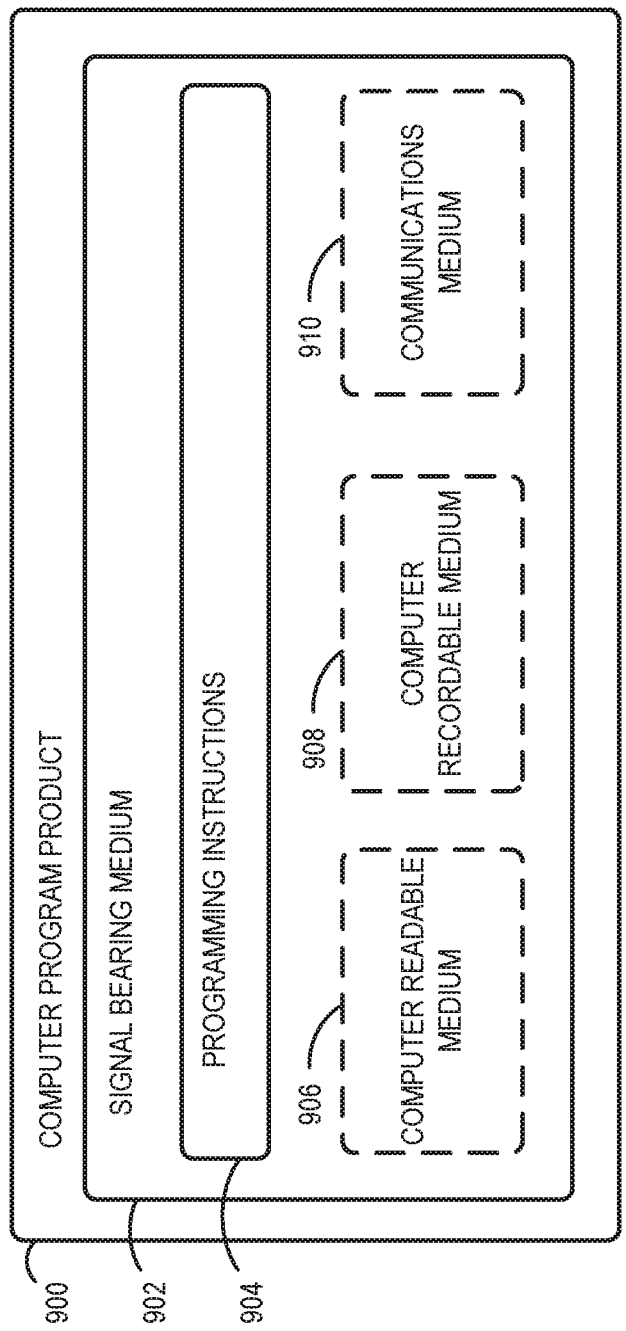
FIG. 9 is a schematic illustrating a conceptual partial view of a computer program for executing a computer process on a computing system, arranged according to at least some embodiments presented herein.

FIG. 9 is a schematic illustrating a conceptual partial view of a computer program for executing a computer process on a computing system, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 100 of FIG. 1 or system 500 of FIG. 5, and/or another system described herein may be configured to provide various operations, functions, or actions in response to the programming instructions 904 conveyed to the computer system by one or more of the computer readable medium 906, the computer recordable medium 908, and/or the communications medium 810.

The non-transitory computer readable medium could also be distributed among multiple data storage elements, which could be remotely located from each other. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

We claim:

1. A method for training a pitch-predicting encoder comprising:
generating a first training sample based on an input audio sample, wherein generating the first training sample involves applying a first frequency shift to the input audio sample;
generating a second training sample based on the input audio sample, wherein generating the second training sample involves applying a second frequency shift to the input audio sample, and wherein each of the first frequency shift and the second frequency shift is a positive amount, a negative amount, or a zero amount, such that at least one of the first training sample and the second training sample represents a frequency-shifted version of the input audio sample;
applying the first training sample and the second training sample to the encoder to generate a first predicted pitch value and a second predicted pitch value;
determining an encoder cost function based on a pitch error term, wherein the pitch error term depends on: (i) a first difference between the first predicted pitch value and the second predicted pitch value, and (ii) a second difference between the first frequency shift and the second frequency shift; and
modifying the encoder based on the encoder cost function.

2. The method of claim 1, wherein the first frequency shift is a first non-zero amount and the second frequency shift is a second non-zero amount, and wherein the first non-zero amount is different than the second non-zero amount.

3. The method of claim 1, wherein the encoder includes a neural network having at least one convolutional layer.

4. The method of claim 1, wherein generating the first training sample further comprises:
applying a frequency transformation to the input audio sample to generate a transformed version of the input audio sample; and
frequency-shifting the transformed version of the input audio sample.

5. The method of claim 4, wherein applying the frequency transformation to the input audio sample comprises:
applying a constant-Q transform to the input audio sample.

6. The method of claim 1, wherein applying the first training sample and the second training sample to the encoder to generate the first predicted pitch value and the second predicted pitch value further comprises:
generating a first pitch confidence value and a second pitch confidence value.

7. The method of claim 6, wherein the encoder comprises:
at least one convolutional layer;
a pitch head that receives inputs from the at least one convolutional layer and that outputs a predicted pitch value; and
a confidence head that receives inputs from the at least one convolutional layer and that outputs a pitch confidence value; and
wherein modifying the encoder based on the encoder cost function comprises:
updating, based on the encoder cost function, at least one parameter of the at least one convolutional layer and at least one parameter of the pitch head, and wherein the method further comprises:
determining a confidence cost function based on: (i) the first and second pitch confidence values, (ii) the first difference between the first predicted pitch value and the second predicted pitch value, and (iii) the second difference between the first frequency shift and the second frequency shift; and
updating at least one parameter of the pitch head based on the confidence cost function.

8. The method of claim 6, wherein the encoder comprises:
at least one convolutional layer;
a pitch head that receives inputs from the at least one convolutional layer and that outputs a predicted pitch value, wherein the pitch head comprises two fully-connected layers; and
a confidence head that receives inputs from the at least one convolutional layer and that outputs a pitch confidence value, wherein the pitch head comprises one fully-connected layer.

9. The method of claim 1, further comprising:
applying the first and second predicted pitch values to a decoder to generate a first reconstructed audio sample and a second reconstructed audio sample;
determining a reconstruction error term based on a third difference between the first reconstructed audio sample and the second reconstructed audio sample, wherein determining the encoder cost function involves determining the encoder cost function based on the reconstruction error term; and
updating at least one parameter of the decoder based on the reconstruction error term.

10. The method of claim 9, wherein the decoder has a structure that is an inverted version of a structure of the encoder.

11. The method of claim 1, wherein determining an encoder cost function based on a pitch error term comprises applying a nonlinear function to the pitch error term, wherein the nonlinear function is linear for values of the pitch error term that are greater in magnitude than a threshold value and nonlinear for values of the pitch error term that are lesser in magnitude than the threshold value.

12. The method of claim 11, wherein the nonlinear function is a Huber loss function.

13. The method of claim 1, further comprising:
generating a third training sample by adding background noise to the first training sample;
applying the third training sample to the encoder to generate a third predicted pitch value; and generating a second pitch error term based on a difference between the second predicted pitch value and the third predicted pitch value and the first difference between the first frequency shift and the second frequency shift,
wherein determining the encoder cost function comprises determining the encoder cost function based on the second pitch error term.

14. The method of claim 13, further comprising:
generating a fourth training sample by adding background noise to the second training sample;
applying the fourth training sample to the encoder to generate a fourth predicted pitch value;
generating a third pitch error term based on a difference between the first and fourth predicted pitch values and the difference between the first frequency shift and the second frequency shift; and
generating a fourth pitch error term based on a difference between the second and fourth predicted pitch values and the second difference between the first frequency shift and the second frequency shift,
wherein determining the encoder cost function comprises determining the encoder cost function based on the third and fourth pitch error term.

15. The method of claim 1, further comprising:
obtaining a further audio sample; and
applying the further audio sample to the encoder to generate a predicted relative pitch value for the further audio sample.

16. The method of claim 1, further comprising:
obtaining a calibration audio sample;
obtaining a ground truth pitch value for the calibration audio sample;
applying the calibration audio sample to the encoder to generate a calibration pitch value; and
based on the ground truth pitch value and the calibration pitch value, determining a bias pitch value for the encoder.

17. The method of claim 16, further comprising:
obtaining a further audio sample;
applying the further audio sample to the encoder to generate a predicted relative pitch value for the further audio sample; and
determining, based on the further predicted pitch value and the bias pitch value, a predicted absolute pitch value for the further audio sample.

18. A method for predicting a pitch for an audio sample, the method comprising:
obtaining an audio sample; and
applying the audio sample to an encoder to generate, for the audio sample, at least one of a predicted relative pitch value or a predicted absolute pitch value, wherein the encoder has been trained according to the method of claim 1.

19. An article of manufacture including a non-transitory computer-readable medium, having stored thereon program instructions that, upon execution by a computing device, cause the computing device to perform the method of claim 1.

20. A system comprising:
a controller; and
a non-transitory computer-readable medium, having stored thereon program instructions that, upon execution by the controller, cause the controller to perform the method of claim 1.

* * * * *